United States Patent
Ringlein et al.

(10) Patent No.: US 12,461,943 B1
(45) Date of Patent: Nov. 4, 2025

(54) REFINEMENT OF LARGE MULTI-DIMENSIONAL SEARCH SPACES

(71) Applicant: International Business Machines Corporation, Armonk, NY (US)

(72) Inventors: Burkhard Ringlein, Bülach (CH); Srikumar Venugopal, Dublin (IE); Michael Johnston, Dublin (IE); Christoph Hagleitner, Wallisellen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/756,150

(22) Filed: Jun. 27, 2024

(51) Int. Cl.
*G06F 16/00* (2019.01)
*G06F 16/28* (2019.01)

(52) U.S. Cl.
CPC ................................ *G06F 16/283* (2019.01)

(58) Field of Classification Search
CPC .................................................... G06F 16/283
See application file for complete search history.

(56) References Cited

U.S. PATENT DOCUMENTS

| | | | |
|---|---|---|---|
| 6,122,628 A * | 9/2000 | Castelli | G06F 16/2264 707/999.005 |
| 7,272,593 B1 * | 9/2007 | Castelli | G06F 18/41 707/999.005 |
| 7,720,792 B2 * | 5/2010 | Price | G06F 16/313 707/750 |
| 11,055,639 B1 * | 7/2021 | Cay | G06F 9/547 |
| 11,526,799 B2 | 12/2022 | Moore et al. | |
| 11,797,340 B2 | 10/2023 | Cao et al. | |
| 12,282,807 B1 * | 4/2025 | Long | G06F 9/54 |
| 2004/0249809 A1 * | 12/2004 | Ramani | G06F 16/5854 |
| 2007/0282811 A1 * | 12/2007 | Musgrove | G06F 16/2423 |
| 2008/0243779 A1 * | 10/2008 | Behnen | G06F 16/283 |
| 2009/0100019 A1 * | 4/2009 | White | G06F 16/332 |

(Continued)

FOREIGN PATENT DOCUMENTS

| | | |
|---|---|---|
| CN | 112328332 A | 2/2021 |
| CN | 113220466 A | 8/2021 |

OTHER PUBLICATIONS

Li et al., GP-NAS: Gaussian Process based Neural Architecture Search, Jun. 13-19, 2020.

(Continued)

*Primary Examiner* — Noosha Arjomandi
(74) *Attorney, Agent, or Firm* — Garg Law Firm, PLLC; Rakesh Garg; James Olsen

(57) ABSTRACT

An embodiment includes detecting a search request of a multi-dimensional search space by a system; responsive to detecting the search request, sampling representative parameters in the multi-dimensional search space based on a sampling threshold. The embodiment includes determining a parameter range of the representative parameters in the multi-dimensional search space. The embodiment also includes transforming a part of the multi-dimensional search space based on a statistical guarantee and the parameter range, where the part of the multi-dimensional search space is a refined space for a solution of the search request.

17 Claims, 7 Drawing Sheets

(56) References Cited

U.S. PATENT DOCUMENTS

| | | | |
|---|---|---|---|
| 2013/0138646 A1* | 5/2013 | Sirer .................. | G06F 16/951 707/736 |
| 2013/0194308 A1* | 8/2013 | Privault ............. | G06F 3/04842 345/650 |
| 2015/0242461 A1* | 8/2015 | Kung ................ | G06F 16/90339 707/769 |
| 2018/0203921 A1* | 7/2018 | Privault ............. | G06F 16/3323 |
| 2019/0244139 A1 | 8/2019 | Varadarajan et al. | |
| 2020/0192944 A1* | 6/2020 | Nakhjavani ......... | G06F 17/175 |
| 2021/0026853 A1* | 1/2021 | Sawada .............. | G06Q 10/04 |
| 2022/0365920 A1* | 11/2022 | Furusho ............. | G06F 16/9535 |
| 2023/0228446 A1* | 7/2023 | Lee .................... | G05B 19/042 700/276 |

OTHER PUBLICATIONS

Belakaria et al., Max-value Entropy Search for Multi-Objective Bayesian Optimization, 33rd Conference on Neural Information Processing Systems (NeurIPS 2019), Dec. 2019, Vancouver, Canada.

Klein et al., Fast Bayesian Optimization of Machine Learning Hyperparameters on Large Datasets, 20th International Conference on Artificial Intelligence and Statistics (AISTATS) 2017, May 23, 2016, Fort Lauradel, Florida.

Ircio et al., Mutual Information Based Feature Subset Selection in Multivariate Time Series Classification, Jul. 2020.

Xu et al., Gaussian Process Based Expected Information Gain Computation for Bayesian Optimal Design, Feb. 24, 2020.

Contal et al., Gaussian Process Optimization with Mutual Information, 31st International Conference on Machine Learning, 2014.

Gao et al., Resource-Guided Configuration Space Reduction for Deep Learning Models, 2021 IEEE/ACM 43rd International Conference on Software Engineering (ICSE), May 22-30, 2021.

Li et al., Efficient End-to-End AutoML via Scalable Search Space Decomposition (Extended Paper), Jun. 24, 2022.

Brochu et al., A Tutorial on Bayesian Optimization of Expensive Cost Functions, with Application to Active User Modeling and Hierarchical Reinforcement Learning, Dec. 12, 2010.

Stander et al., On the Robustness of a Simple Domain Reduction Scheme for Simulation-Based Optimization, Jun. 2002.

Github, Sequential Domain Reduction, 2024, https://github.com/bayesian-optimization/BayesianOptimization/blob/master/examples/domain_reduction.ipynb.

Wikipedia, Latin hypercube sampling, Apr. 30, 2024, https://en.wikipedia.org/wiki/Latin_hypercube_sampling.

Wikipedia, Mutual information, Apr. 30, 2024, https://en.wikipedia.org/wiki/Mutual_information.

Wikipedia, Decision Tree, Apr. 30, 2024, https://en.wikipedia.org/wiki/Decision_tree.

Wikipedia, k-means clustering, Apr. 30, 2024, https://en.wikipedia.org/wiki/K-means_clustering.

Wikipedia, Silhouette (clustering), Apr. 30, 2024, https://en.wikipedia.org/wiki/Silhouette_(clustering).

Ray, Effortlessly Scale Your Most Complex Workloads, 2024, https://www.ray.io.

Kubernetes, Production-Grade Container Orchestration, 2024, https://kubernetes.io.

Wikipedia, Rest, Apr. 30, 2024, https://en.wikipedia.org/wiki/REST.

International Searching Authority, "Notification of Transmittal of the International Search Report and the Written Opinion of the International Searching Authority, or Declaration," Patent Cooperation Treaty Jul. 28, 2025, 07 pages, International Application No. PCT/IB2025/055924.

Yang et al., "VDTuner: Automated Performance Tuning for Vector Data Management Systems", 2024 IEEE 40th International Conference on Data Engineering (ICDE), Apr. 16, 2024, pp. 4357-4369.

* cited by examiner

Fig. 7

UNINFORMED CONFIGURATION SPACE FOR LLM FLAN
710

| CONFIGURATION PARAMETER | POSSIBLE VALUES |
|---|---|
| CPU CORES | 2, 4, 8 16 |
| NUMBER OF GPUs | 1, 2, 4 |
| GPU MODEL | A100-80GB-PCIE, A100-PCIE-40GB, TESLA-T4, V100-PCIE-16GB |
| CONTAINER MEMORY | 16GI, 32GI, 64GI |
| MAX BATCH SIZZE | 4, 4, 12, 24, 64, 128, 256 |
| MAX SEQUENCE LENGTH | 1024, 2048 |
| MAX BATCH WEIGHT | NULL, 1000000, 2000000, 5000000, 10000000, 20000000, 50000000, 100000000, 1000000000 |
| MAX CONCURRENT REQ. | 100, 200, 400 |
| MAX NEW TOKENS | 128, 381, 512 |
| MAX WAITING TOKENS | 4, 8, 12 16, 24 |
| PT2 COMPILE | TRUE, FALSE |
| FLASH ATTENTION | TRUE, FALSE |
| DTYPE | FLOAT 16, FLOAT 32 |

720

| WORKLOAD | LARGE CONFIGURATION SPACE SIZE | REFINED CONFIGURATION SPACE SIZE | SAMPLES REQUIRED |
|---|---|---|---|
| SPARK | 51,840 | 180 (0.3472%) | 46 (0.0887%) |
| LLM | 5,598,720 | 324 (0.0058%) | 193 (0.0034%) |

REFINEMENT OF LARGE MULTI-DIMENSIONAL SEARCH SPACES

BACKGROUND

The present invention relates generally to search computing. More particularly, the present invention relates to a method, system, and computer program for Refinement of Large Multi-dimensional Search Spaces.

Multi-dimensional data constitute a large number of parameters and domains of parameters. Examples of multi-dimensional data include workload configurations, machine learning models, big data analytics in technology, healthcare, and research. Computational exploration of large search spaces on multi-dimensional data involves large and complex search spaces comprising of parameters and many combinations of parameters from which decisions, solutions, and answers are to be discovered. Many applications of large search spaces contain millions of possible combinations which would take hundreds of years to search exhaustively. Therefore, computational exploration of large search spaces is prohibitive in both time and computing resources.

SUMMARY

The illustrative embodiments provide for Refinement of Large Multi-dimensional Search Spaces. An embodiment includes detecting a search request of a multi-dimensional search space by a system. The embodiment includes responsive to detecting the search request, sampling representative parameters in the multi-dimensional search space based on a sampling threshold. The embodiment includes determining a parameter range of the representative parameters in the multi-dimensional search space. The embodiment also includes transforming a part of the multi-dimensional search space based on a statistical guarantee and the parameter range, where the part of the multi-dimensional search space is a refined space for a solution of the search request.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 7 depicts tables in accordance with an illustrative embodiment.

DETAILED DESCRIPTION

Figure 1:
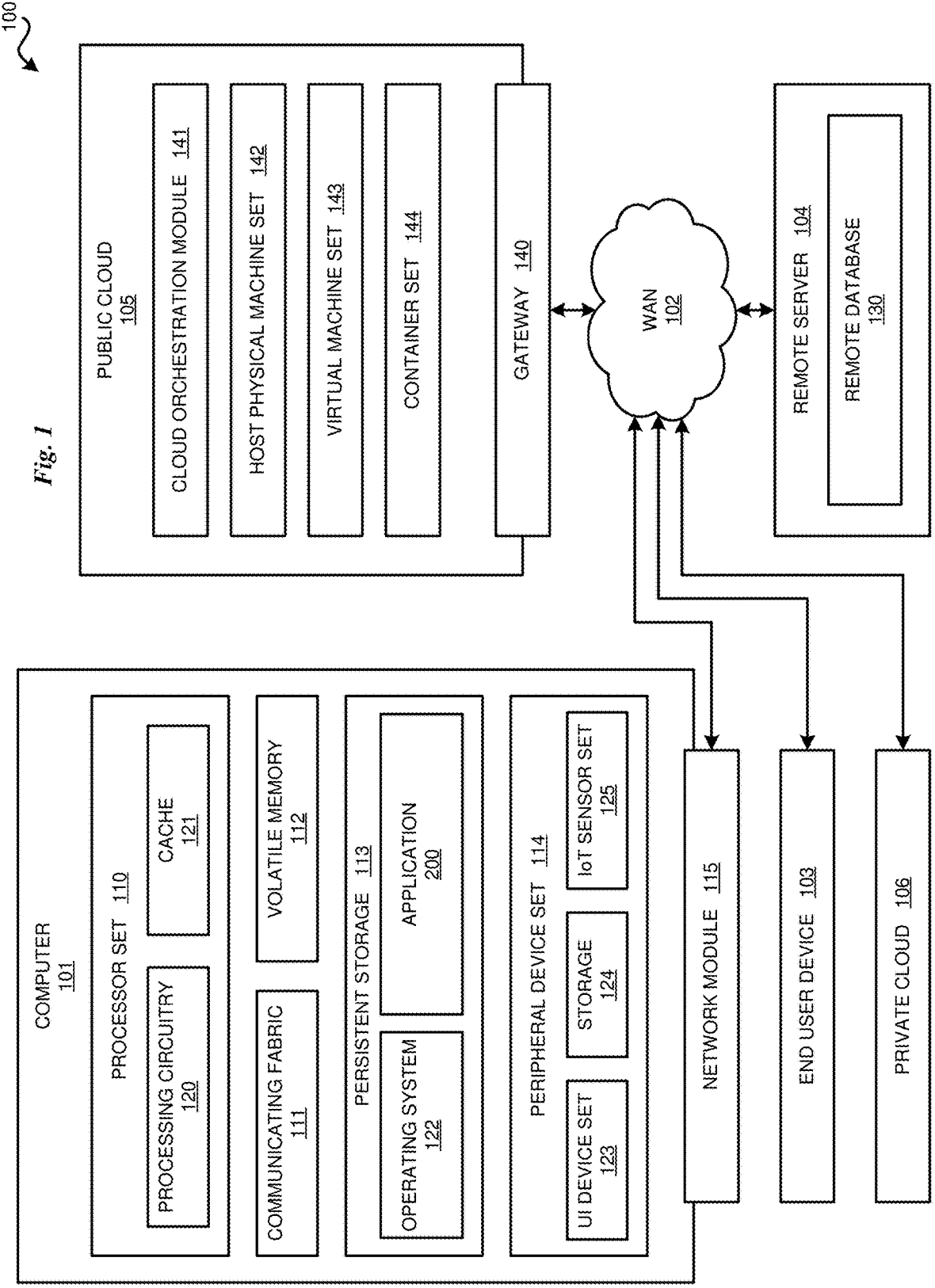
FIG. 1 depicts a block diagram of a computing environment in accordance with an illustrative embodiment.

Multi-dimensional data constitute a large number of parameters and domains of parameters. Examples of multi-dimensional data include workload configurations, machine learning models, big data analytics in technology, healthcare, and research. Computational exploration of large search spaces on multi-dimensional data involves large and complex search spaces comprising of parameters and many combinations of parameters from which decisions, solutions, and answers are to be discovered. Many applications of large search spaces contain millions of possible combinations which would take hundreds of years to search exhaustively. Therefore, computational exploration of large search spaces is prohibitive in both time and computing resources.

The present disclosure addresses the deficiencies described above by providing a method, a machine-readable medium, and a system for Refinement of Large Multi-dimensional Search Spaces. An embodiment includes detecting a search request of a multi-dimensional search space by a system. The embodiment includes responsive to detecting the search request, sampling representative parameters in the multi-dimensional search space based on a sampling threshold. The embodiment includes determining a parameter range of the representative parameters in the multi-dimensional search space. The embodiment also includes transforming a part of the multi-dimensional search space based on a statistical guarantee and the parameter range, wherein the part of the multi-dimensional search space is a refined space for a solution of the search request. Thus, the embodiment provides a method of refinement of large multi-dimensional search spaces. The above limitations advantageously enable refinement of large multi-dimensional search spaces. The refinement of large multi-dimensional search spaces into a refined space improves and provides advantages including but not limited to the efficiency, accuracy and reliability of search computing. Other embodiments of this aspect include a machine-readable medium, and a system.

Illustrative embodiments include generating samples of the multi-dimensional search space parameters, evaluating the samples, ranking the samples, pruning the samples of the multi-dimensional search space parameters that are below the statistical guarantee, and generating further samples. Thus, the embodiment advantageously enables generating samples of the multi-dimensional search space parameters, evaluating the samples, pruning the multi-dimensional search space parameters that are below the statistical guarantee, and generating further samples in a method of refinement of large multi-dimensional search spaces. As generating samples of the multi-dimensional search space consumes processing time and computing resources, sampling below the statistical guarantee, conserves computing resources and time.

Illustrative embodiments include where the statistical guarantee is updated based on the samples and the refined spaces. Thus, the embodiment advantageously enables the statistical guarantee is updated based on the samples and the refined spaces in a method of refinement of large multi-dimensional search spaces.

Illustrative embodiments include where the sampling comprises computing a Latin Hypercube Sampling. Thus, the embodiment advantageously enables where the sampling comprises computing a Latin Hypercube Sampling in a method of refinement of large multi-dimensional search spaces.

Illustrative embodiments include where determining a parameter range of the representative parameters comprises computing a Pareto filter on a decision tree of the representative parameters in the multi-dimensional search space. Thus, the embodiment advantageously enables where determining a parameter range of the representative parameters comprises computing a Pareto filter on a decision tree of the representative parameters in the multi-dimensional search space in a method of refinement of large multi-dimensional search spaces. This may produce a parameter range of representative parameters to refine the multi-dimensional search space.

Illustrative embodiments include where the representative parameters are determined based on performing a Design of Experiment on parameters in the multi-dimensional search space. Thus, the embodiment advantageously enables where the representative parameters are determined based on performing a Design of Experiment on parameters in the multi-dimensional search space in a method of refinement of large multi-dimensional search spaces. This may produce a higher quality and/or higher accuracy refined search space comprising of representative parameters.

Illustrative embodiments also include where the transforming further comprises computing an information gain of the representative parameters. Thus, the embodiment advantageously enables where the transforming further comprises computing an information gain of the representative parameters in a method of refinement of large multi-dimensional search spaces. This may produce effective classification of the parameters for the refined search space.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 that provides Refinement of Large Multi-dimensional Search Spaces. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made. Available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of Application Programming Interfaces (API). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
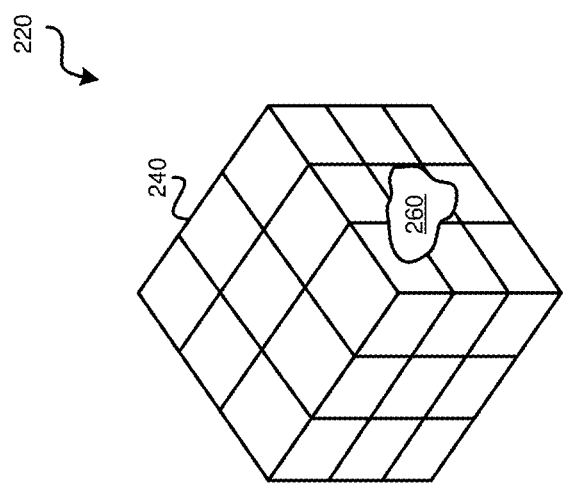
FIG. 2 depicts a diagram in an environment in accordance with an illustrative embodiment.

FIG. 2 depicts a diagram in an environment in accordance with an illustrative embodiment. In a particular embodiment, the components of the diagram 220 show aspects of the Application 200 of FIG. 1.

In the illustrated embodiment, a large multi-dimensional search space 240 may comprise of parameters, their values and combinations of parameter values in many dimensions or domains. Since the search space is large, an expert of the data may only have knowledge of a small portion of the space 260, which may not be representative or may be based on incorrect assumptions. Exploring the search space exhaustively may be prohibitive in both time and computer resources. As shown in the embodiments described herein, large multi-dimensional search spaces are sampled with a sampling pattern that takes a representative sample but within a reasonable sampling threshold, and apply an application agnostic evaluation of the samples to select a refined space of the large multi-dimensional search space.

Figure 3:
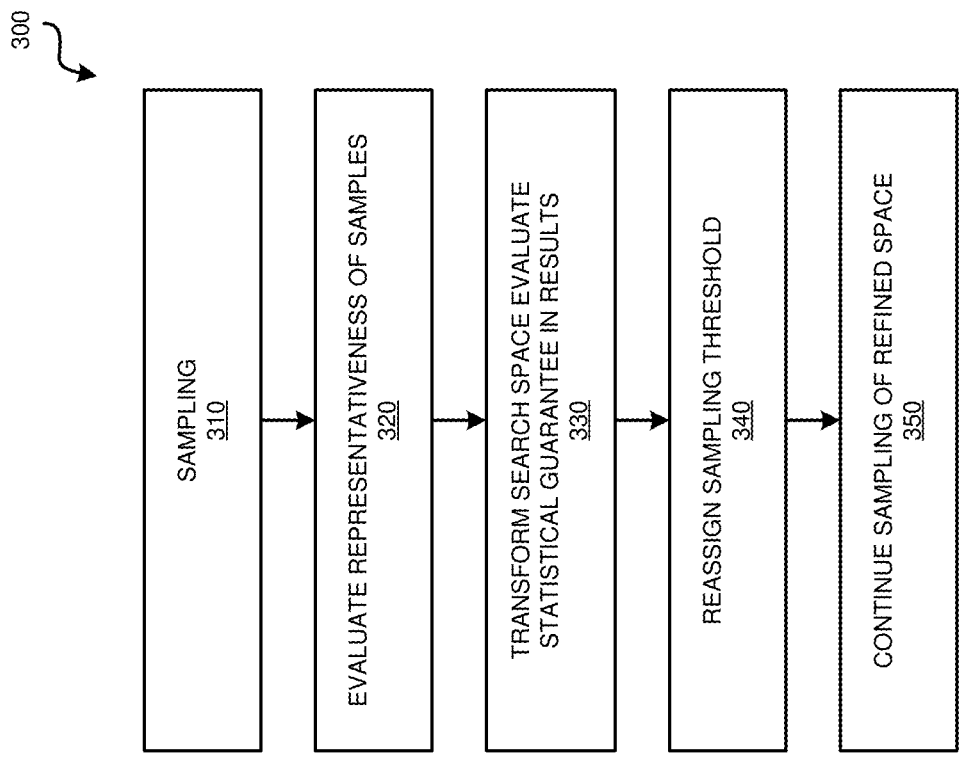
FIG. 3 depicts a flowchart diagram in an environment in accordance with an illustrative embodiment.

FIG. 3 depicts a flowchart diagram in an environment in accordance with an illustrative embodiment. In a particular embodiment, the components of the diagram 300 show aspects of the Application 200 of FIG. 1.

In the illustrated embodiment, a search request of a multi-dimensional search space is detected by a system. At block 310, responsive to detecting the search request, sampling of parameter values in the multi-dimensional search space based on a sampling threshold. In embodiments, the sampling threshold may be a percentage of the total search space or based on the number of parameters in the search space. In other embodiments, the sampling threshold may be based on the information gain. The sampling threshold may also be user defined. Next, at block 320, the embodiment evaluates representativeness of the samples. In embodiments, the representativeness of the samples is evaluated by executing applied statistics that deals with planning, conducting, analyzing, and interpreting controlled tests to evaluate the factors that control the value of a parameter or group of parameters, also known as Design of Experiment (DOE) methods. For example, DOE methods may include Latin Hypercube Sampling (LHS) or similar techniques.

At block 330, the transforming of part of the multi-dimensional search space based on a statistical guarantee and the parameter value range, and evaluation of the statistical guarantee in the results is performed. In embodiments, the transforming comprises of generating samples of the multi-dimensional search space parameters, evaluating the samples, ranking the samples, pruning the multi-dimensional search space samples that are below the statistical guarantee and generating further samples. The part of the multi-dimensional search space is a refined space of high probability for a solution of the search request.

This is followed at block 340 by the embodiment reassigning the sampling threshold based on further sampling of the parameters of the refined spaces at block 350.

Figure 4:
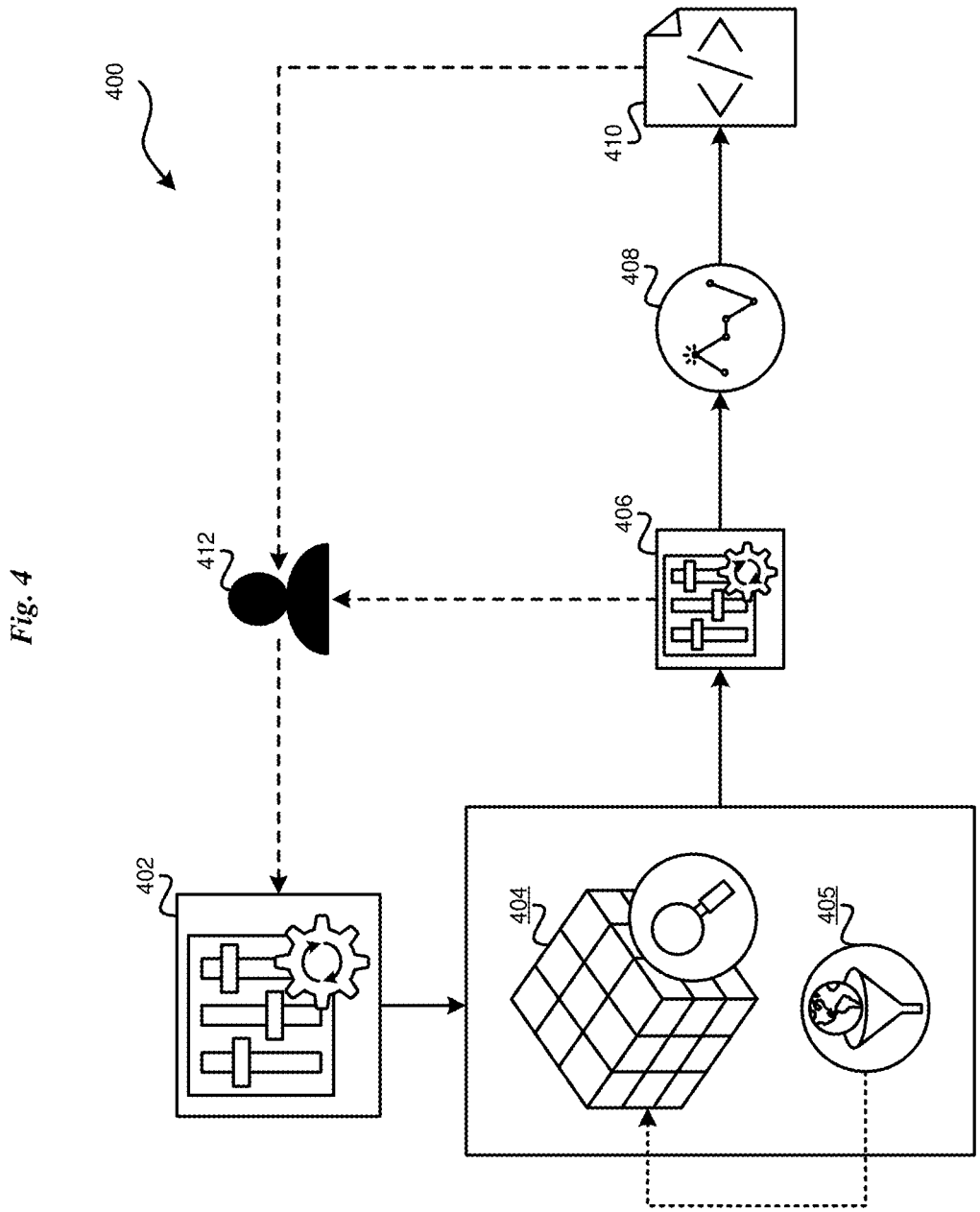
FIG. 4 depicts a diagram in accordance with an illustrative embodiment.

FIG. 4 depicts a diagram in accordance with an illustrative embodiment. In a particular embodiment, the components of the diagram 400 are representative of aspects of the Application 200 of FIG. 1.

In the illustrated embodiment, a search request is initiated by a user on a large multi-dimensional search space 412. Responsive to the request, representative samples of the multi-dimensional search space parameters are collected across the big search space 402 of N dimensions based on a DOE method such as the Latin Hypercube Sampling (LHS) as shown in 404. In some embodiments, the LHS sample size N is at least twice the number of dimensions. For example, N may be the number of parameters in the search space. The results of the DOE computations are analyzed by applying the Information Gain (IG) of each parameter as shown in 405. If the IG of a new result falls below a configured statistical guarantee, the DOE computations are stopped.

The IG analysis results based on all sampling results are taken to (1) determine valid value ranges and (2) determine important and unimportant parameters, and prune the unimportant parameters. In an embodiment, each parameter (dimension in the search space) is assigned an entropy value (measuring the information content) and the IG is computed for the parameter. A decision tree is constructed, by evaluating the output from the IG for each parameter, and selecting the parameter that maximizes the information gain, which in turn minimizes the entropy and best splits the parameters into groups for effective classification. These parameters are the important parameters which define the refined small search space shown in 406. Some of the parameter value combinations may not be feasible due to conditional dependencies between two or more parameters. The decision tree is trained to predict if parameters and/or a combination of parameters would lead to a failure, the resulting tree is then parsed to determine parameter ranges. In some embodiments, a Principal Component Analysis (PCA) may be used instead of the decision tree to determine the valid parameter ranges.

A Pareto filter may be computed that determines the parameters and/or combination of parameters that are above a configured statistical guarantee (e.g. 80%). In an embodiment, the parameters are ranked and the parameters that are below the guarantee are pruned. In some embodiments, the steps described herein including generating samples of the refined spaces of the multi-dimensional search space are repeated 408 until the best refined search space 410 is achieved. The samples are evaluated, and the statistical guarantee is updated based on the samples and the refined spaces.

Figure 5:
FIG. 5 depicts a depicts an Information Gain (IG) algorithm in accordance with an illustrative embodiment.

FIG. 5 depicts an Information Gain (IG) algorithm 500 in accordance with an illustrative embodiment. In the depiction, the IG is expressed as shown where H(X) is the uncertainty before Y is known, H(X|Y) is the uncertainty after Y is known, P(X, Y) is the joint probability, and P(X) and P(Y) are the marginal probabilities of X and Y respectively. In an illustrated embodiment, the entropy is the measure of the variance of the data such as the sampled parameters of the multi-dimensional search space. In some embodiments, H(X|Y) is the entropy of X given the parameter Y. A decision tree is then constructed by evaluating the output from the IG for each parameter, and selecting the parameter that maximizes the information gain, which in turn minimizes the entropy and best splits the parameters into groups for effective classification.

Figure 6:
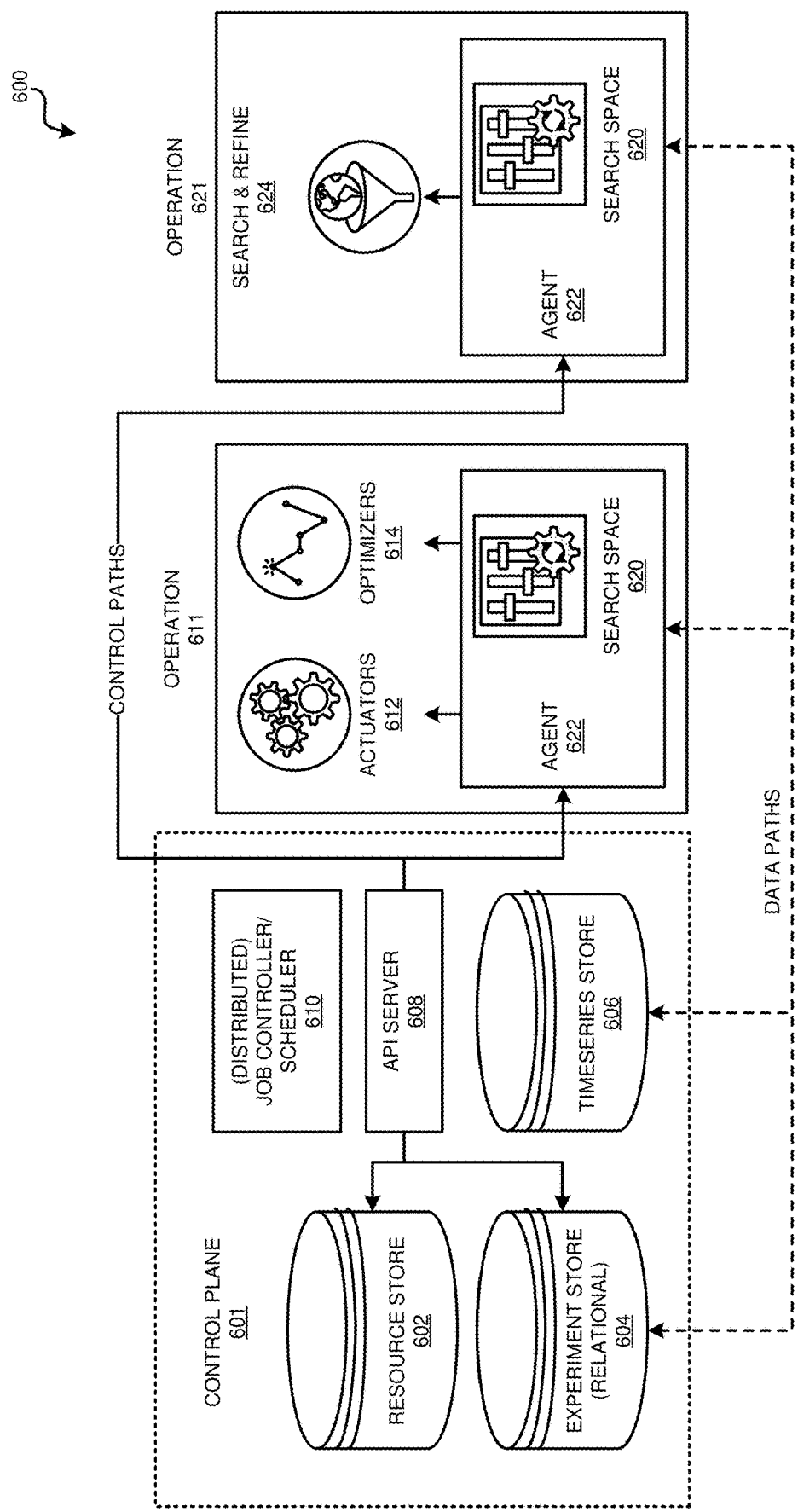
FIG. 6 depicts a system diagram in accordance with an illustrative embodiment.

FIG. 6 depicts a system diagram in accordance with an illustrative embodiment. In a particular embodiment, the components of the diagram 600 are representative of aspects of the Application 200 of FIG. 1.

In the illustrated embodiment, the system comprises a control plane 601 further comprising a Resource Store 602, an Experiment Store 604, a Timeseries Store 606, an API Server 608, and a Job Controller/Scheduler 610. The Resource Store 602, Experiment Store 604, and the Timeseries Store 606 may be a data store that is a digital repository that stores and safeguards the information in the computer system, that may be deployed on a system such as Kubernetes. The data store can be network-connected storage, distributed cloud storage, a physical hard drive, or virtual storage. A distributed storage system is infrastructure that can split data across multiple physical servers, and often across more than one data center. It typically takes the form of a cluster of storage units, with a mechanism for data synchronization and coordination between cluster nodes. For example, the Experiment Store 604 may be a relational database on which DOE computations are performed.

In embodiments, the Job Controller/Scheduler 610 schedules and controls a search request operation 611 through the API Server 608, and to an Agent 622 to actuate using Actuators 612, the Optimizers 614 to optimize the Search Space 620.

In some embodiments, the Job Controller/Scheduler 610 schedules and controls a search request operation 621 through the API Server 608 to an Agent 622 to actuate using Actuators 612 to Search and Refine 624 the Search Space 620. The Search and Refine 624 operations may comprise data stores, floating point units (FPU), network circuits, and read/write circuits. The refinement and improvements described herein comprising of sampling, ranking and pruning of search spaces into refined spaces improve on these technologies in the areas including but not limited to less computing resources. Since the refined space is more refined and smaller, the computing efficiency of the data stores, floating point units (FPU), network circuits, and read/write circuits are improved and accelerate the operation of these components. It should be understood that the embodiments described herein may execute search and refine operations on the search space independently or in combination with the optimization operations.

The following description provides additional examples of embodiments of the present disclosure, and variations and substitutions may be made in other embodiments. Several examples will now be provided to further clarify various aspects of the present disclosure.

Example 1: A computer-implemented method that comprises detecting a search request of a multi-dimensional search space by a system. The method further comprises responsive to detecting the search request, sampling representative parameters in the multi-dimensional search space based on a sampling threshold. The method further comprises where the representative parameters are determined based on performing a Design of Experiment on parameters in the multi-dimensional search space. The method further comprises determining a parameter range of the representative parameters in the multi-dimensional search space. The method further comprises transforming a part of the multi-dimensional search space based on a statistical guarantee and the parameter range, where the transforming further comprises computing an information gain of the representative parameters, and where the part of the multi-dimensional search space is a refined space for a solution of the search request. The method further comprises generating samples of the multi-dimensional search space, evaluating the samples, ranking the samples, pruning the samples of the multi-dimensional search space that are below the statistical guarantee, and generating further samples.

The above limitations advantageously enable refinement of large multi-dimensional search spaces. The refinement of large multi-dimensional search spaces into a refined space improves and provides advantages including but not limited to the efficiency, accuracy and reliability of search computing. For example, sampling representative parameters, where the representative parameters are determined based on performing a Design of Experiment on parameters in the multi-dimensional search space, based on a sampling threshold reduces the number of required samples providing more efficient use of computing resources. Additionally, transforming a part of the multi-dimensional search space based on a statistical guarantee and the parameter range, where the transforming further comprises computing an information gain of the representative parameters, and where the part of the multi-dimensional search space is a refined space for a solution of the search request provides improved accuracy, reducing computer resources such as memory and processing. Additionally, generating samples of the multi-dimensional search space, evaluating the samples, ranking the samples, pruning the samples of the multi-dimensional search space that are below the statistical guarantee, and generating further samples conserves computing resources such as memory and processing time.

Example 2: A computer program product that comprises one or more computer readable storage media, and program instructions collectively stored on the one or more computer readable storage media, the program instructions executable by a processor to cause the processor to perform the method according to Example 1. The computer program product of Example 2 realizes the technical benefits described with respect to Example 1 and described elsewhere herein. The computer program product of Example 2 can advantageously be implemented into a variety of computer program products.

Example 3: A computer system comprising a processor and one or more computer-readable storage media and program instructions collectively stored on the one or more computer readable storage media, the program instructions executable by the processor to cause the processor to perform a method according to Example 1. The computer system of Example 3 realizes the technical benefits described with respect to Example 1 and described elsewhere herein.

Aspects of the present disclosure can be implemented in a variety of technical uses. The following use case is merely exemplary and are not intended to limit the scope of the disclosure.

FIG. 7 depicts tables in accordance with an illustrative embodiment. In the illustrated embodiment, a use case of the embodiments is described comprising a configuration search as the problem of finding an optimal resource and application configuration that meets a defined service level agreement (SLA) for a workload deployment of a large language model (LLM) app. As an example, an uninformed configuration search space for a LLM Fine-tuned Language Net (FLAN) as shown in table 710 may span 5,598,720 possible configurations for an LLM app. An operation on this search space may take about 15 min per experiment, and an exhaustive search would take over 128 years.

The configuration parameters are sampled according to a sampling threshold equivalent to about twice the number of configuration parameters. A parameter range of the representative parameters is determined, and a part of the multi-dimensional search space based on a statistical guarantee, for example 80%, is determined. Transforming of the configuration search space is performed based on the statistical guarantee and the parameter range, resulting in a refined configuration refined space size of 324, 0.0058% of the original size as shown in table 720. A use case of the embodiments on a Spark workload results on an original search space of 51,840 results in a refined configuration space of 180, 0.3472% of the original size.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   detecting a search request of a multi-dimensional search space by a system;
   responsive to detecting the search request, sampling representative parameters in the multi-dimensional search space based on a sampling threshold;
   generating samples of the multi-dimensional search space, evaluating the samples, ranking the samples, pruning the samples of the multi-dimensional search space that are below the statistical guarantee, and generating further samples;
   determining a parameter range of the representative parameters in the multi-dimensional search space; and
   transforming a part of the multi-dimensional search space based on a statistical guarantee and the parameter range, wherein the part of the multi-dimensional search space is a refined space for a solution of the search request.

2. The computer-implemented method of claim 1, wherein the statistical guarantee is updated based on the samples and the refined space.

3. The computer-implemented method of claim 1, wherein the sampling comprises computing a Latin Hypercube Sampling.

4. The computer-implemented method of claim 1, wherein determining a parameter range of the representative parameters comprises computing a Pareto filter on a decision tree of the representative parameters in the multi-dimensional search space.

5. The computer-implemented method of claim 1, wherein the representative parameters are determined based on performing a Design of Experiment on parameters in the multi-dimensional search space.

6. The computer-implemented method of claim 1, wherein the transforming further comprises computing an information gain of the representative parameters.

7. A computer program product comprising one or more computer readable storage media, and program instructions collectively stored on the one or more computer readable storage media, the program instructions executable by a processor to cause the processor to perform operations comprising:
   detecting a search request of a multi-dimensional search space by a system;
   responsive to detecting the search request, sampling representative parameters in the multi-dimensional search space based on a sampling threshold;
   generating samples of the multi-dimensional search space, evaluating the samples, ranking the samples, pruning the samples of the multi-dimensional search space that are below the statistical guarantee, and generating further samples;
   determining a parameter range of the representative parameters in the multi-dimensional search space; and
   transforming a part of the multi-dimensional search space based on a statistical guarantee and the parameter range, wherein the part of the multi-dimensional search space is a refined space for a solution of the search request.

8. The computer program product of claim 7, wherein the statistical guarantee is updated based on the samples and the refined spaces.

9. The computer program product of claim 7, wherein the sampling comprises computing a Latin Hypercube Sampling.

10. The computer program product of claim 7, wherein determining a parameter range of the representative parameters comprises computing a Pareto filter on a decision tree of the representative parameters in the multi-dimensional search space.

11. The computer program product of claim 7, wherein the representative parameters are determined based on performing a Design of Experiment on parameters in the multi-dimensional search space.

12. The computer program product of claim 7, wherein the transforming further comprises computing an information gain of the representative parameters.

13. A computer system comprising a processor and one or more computer readable storage media, and program instructions collectively stored on the one or more computer readable storage media, the program instructions executable by the processor to cause the processor to perform operations comprising:
   detecting a search request of a multi-dimensional search space by a system;
   responsive to detecting the search request, sampling representative parameters in the multi-dimensional search space based on a sampling threshold;
   generating samples of the multi-dimensional search space, evaluating the samples, ranking the samples, pruning the samples of the multi-dimensional search space that are below the statistical guarantee, and generating further samples;
   determining a parameter range of the representative parameters in the multi-dimensional search space; and
   transforming a part of the multi-dimensional search space based on a statistical guarantee and the parameter range, wherein the part of the multi-dimensional search space is a refined space for a solution of the search request.

14. The computer system of claim 13, wherein the statistical guarantee is updated based on the samples and the refined spaces.

15. The computer system of claim 13, wherein determining a parameter range of the representative parameters comprises computing a Pareto filter on a decision tree of the representative parameters in the multi-dimensional search space.

16. The computer system of claim 13, wherein the representative parameters are determined based on performing a Design of Experiment on parameters in the multi-dimensional search space.

17. The computer system of claim 13, wherein the transforming further comprises computing an information gain of the representative parameters.

* * * * *